United States Patent
Shin et al.

(10) Patent No.: US 11,792,667 B2
(45) Date of Patent: Oct. 17, 2023

(54) METHOD AND APPARATUS FOR MODULATION AND DEMODULATION OF SIGNAL IN COMMUNICATION SYSTEM

(71) Applicant: ELECTRONICS AND TELECOMMUNICATIONS RESEARCH INSTITUTE, Daejeon (KR)

(72) Inventors: Wooram Shin, Daejeon (KR); Kyeongpyo Kim, Daejeon (KR); Young-Jo Ko, Daejeon (KR); Kapseok Chang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/564,495

(22) Filed: Dec. 29, 2021

(65) Prior Publication Data
US 2023/0199533 A1    Jun. 22, 2023

(30) Foreign Application Priority Data

Dec. 20, 2021  (KR) .................. 10-2021-0182925
Dec. 29, 2021  (KR) .................. 10-2021-0191803

(51) Int. Cl.
| | |
|---|---|
| *H04W 24/08* | (2009.01) |
| *H04W 72/10* | (2009.01) |
| *H04L 5/00* | (2006.01) |
| *H04B 1/69* | (2011.01) |
| *H04W 72/23* | (2023.01) |

(52) U.S. Cl.
CPC .............. *H04W 24/08* (2013.01); *H04B 1/69* (2013.01); *H04L 5/0048* (2013.01); *H04W 72/23* (2023.01)

(58) Field of Classification Search
CPC ........ H04W 24/08; H04W 72/23; H04B 1/69; H04L 5/0048
See application file for complete search history.

(56) References Cited

U.S. PATENT DOCUMENTS

| | | |
|---|---|---|
| 2020/0162208 A1 | 5/2020 | Moon et al. |
| 2021/0111844 A1 | 4/2021 | Pfadler et al. |

(Continued)

FOREIGN PATENT DOCUMENTS

| | | |
|---|---|---|
| WO | 2017/044660 A1 | 3/2017 |
| WO | 2021/230685 A1 | 11/2021 |

OTHER PUBLICATIONS

R. Hadani et al., "Orthogonal Time Frequency Space Modulation", 2017 IEEE.

*Primary Examiner* — Ronald B Abelson
(74) *Attorney, Agent, or Firm* — LRK PATENT LAW FIRM

(57) ABSTRACT

An operation method of a base station in a communication system may include: performing an operation for channel measurement between the base station and a terminal; determining a size of multiple spreading resource blocks configured in a second two-dimensional (2D) domain based on a result of the channel measurement; transmitting information indicating the size of the multiple spreading resource blocks to the terminal; and performing a communication procedure with the terminal based on the multiple spreading resource blocks having the size.

20 Claims, 4 Drawing Sheets

(56) References Cited

U.S. PATENT DOCUMENTS

| | | |
|---|---|---|
| 2021/0266120 A1 | 8/2021 | Wang et al. |
| 2021/0306197 A1 | 9/2021 | Rakib et al. |
| 2021/0360667 A1 | 11/2021 | Moon et al. |
| 2022/0182271 A1* | 6/2022 | Shin .................... H04L 27/2601 |

* cited by examiner

METHOD AND APPARATUS FOR MODULATION AND DEMODULATION OF SIGNAL IN COMMUNICATION SYSTEM

CROSS-REFERENCE TO RELATED APPLICATIONS

This application claims priority to Korean Patent Applications No. 10-2021-0182925 filed on Dec. 12, 2021, and No. 10-2021-0191803 filed on Dec. 29, 2021, with the Korean Intellectual Property Office (KIPO), the entire contents of which are hereby incorporated by reference.

BACKGROUND

1. Technical Field

The present disclosure relates to a technique for modulating or demodulating signals in a communication system, and more particularly, to a technique for modulating or demodulating a two-dimensional multi-resource block-based multi-carrier waveform.

2. Description of Related Art

With the development of information and communication technology, various wireless communication technologies have been developed. Typical wireless communication technologies include long-term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, in the communication system, a transmitter may transmit signals to a receiver. The signals (e.g., data symbols, modulated signals, transmission signals) transmitted from the transmitter may undergo a delay spread channel, a Doppler spread channel, a frequency selective channel, and/or a time selective channel. In this case, orthogonality of data symbols transmitted through different resources may be damaged. When data symbols are transmitted in two-dimensional (2D) time-frequency resources, a channel over the 2D time-frequency resources may be deteriorated due to fading. In this case, a channel gain value may be reduced, and it may be difficult to successfully detect or decode data symbols having the reduced channel gain value.

SUMMARY

Accordingly, exemplary embodiments of the present disclosure are directed to a method and an apparatus for modulating or demodulating signals in a communication system.

According to a first exemplary embodiment of the present disclosure, an operation method of a base station in a communication system may comprise: performing an operation for channel measurement between the base station and a terminal; determining a size of multiple spreading resource blocks configured in a second two-dimensional (2D) domain based on a result of the channel measurement; transmitting information indicating the size of the multiple spreading resource blocks to the terminal; and performing a communication procedure with the terminal based on the multiple spreading resource blocks having the size, wherein when the communication procedure is a transmission procedure, data symbols in a first 2D domain are spread to the multiple spreading resource blocks configured in the second 2D domain, and when the communication procedure is a reception procedure, the multiple spreading resource blocks configured in the second 2D domain are despread to data symbols in the first 2D domain.

The performing of the operation for the channel measurement may comprise: transmitting sounding reference signal (SRS) configuration information to the terminal; receiving an SRS from the terminal based on the SRS configuration information; and performing the channel measurement based on the SRS, wherein the SRS is configured to be transmitted in the first 2D domain or the second 2D domain.

When the SRS is transmitted in the first 2D domain, the SRS configuration information may include first 2D domain resource allocation information indicating first 2D domain resources to which the SRS is mapped and second 2D domain resource allocation information indicating second 2D domain resources to which the SRS mapped to the first 2D domain resources is spread.

The performing of the operation for the channel measurement may comprise: transmitting channel state information-reference signal (CSI-RS) configuration information to the terminal; transmitting a CSI-RS to the terminal based on the CSI-RS configuration information; and receiving, from the terminal, channel measurement information generated based on the CSI-RS, wherein the CSI-RS is configured to be transmitted in the first 2D domain or the second 2D domain.

The information indicating the size of the multiple spreading resource blocks may be transmitted through a radio resource control (RRC) message.

The transmitting of the information indicating the size of the multiple spreading resource blocks may comprise: transmitting an RRC message including information indicating candidate sizes of the multiple spreading resource blocks to the terminal; and transmitting a medium access control (MAC) control element (CE) or downlink control information (DCI) indicating one candidate size among the candidate sizes to the terminal.

The first 2D domain may be a delay-Doppler domain, and the second 2D domain may be a frequency-time domain.

According to a second exemplary embodiment of the present disclosure, an operation method of a terminal in a communication system may comprise: performing an operation for channel measurement between the terminal and a base station; receiving, from the base station, information indicating a size of multiple spreading resource blocks determined based on a result of the channel measurement; and performing a communication procedure based on the multiple spreading resource blocks having the size, wherein when the communication procedure is a transmission procedure, data symbols in a first 2D domain are spread to the multiple spreading resource blocks configured in a second 2D domain, and when the communication procedure is a reception procedure, the multiple spreading resource blocks configured in the second 2D domain are despread to data symbols in the first 2D domain.

The performing of the operation for the channel measurement may comprise: receiving sounding reference signal (SRS) configuration information from the base station; and transmitting an SRS to the base station based on the SRS configuration information, wherein the result of the channel measurement is a result of measuring the SRS, and the SRS is configured to be transmitted in the first 2D domain or the second 2D domain.

When the SRS is configured in the first 2D domain, a rate matching operation may be performed on resources allocated for the SRS, and when the SRS is configured in the second 2D domain, a rate matching operation or a puncturing operation may be performed on resources allocated for the SRS.

The performing of the operation for the channel measurement may comprise: receiving channel state information-reference signal (CSI-RS) configuration information from the base station; performing channel measurement on a CSI-RS received from the base station based on the CSI-RS configuration information; and transmitting a result of the channel measurement to the base station, wherein the CSI-RS is configured to be transmitted in the first 2D domain or the second 2D domain.

When the CSI-RS is configured in the first 2D domain, a rate matching operation may be performed on resources allocated for the SRS, and when the CSI-RS is configured in the second 2D domain, a rate matching operation or a puncturing operation may be performed on resources allocated for the CSI-RS.

When the CSI-RS is transmitted in the first 2D domain, the CSI-RS configuration information may include first 2D domain resource allocation information indicating first 2D domain resources to which the CSI-RS is mapped and second 2D domain resource allocation information indicating second 2D domain resources to which the CSI-RS mapped to the first 2D domain resources is spread.

The information indicating the size of the multiple spreading resource blocks may be received through a radio resource control (RRC) message.

The receiving of the information indicating the size of the multiple spreading resource blocks may comprise: receiving an RRC message including information indicating candidate sizes of the multiple spreading resource blocks from the base station; and receiving a medium access control (MAC) control element (CE) or downlink control information (DCI) indicating one candidate size among the candidate sizes from the base station.

According to a third exemplary embodiment of the present disclosure, an operation method of a terminal in a communication system may comprise: performing an operation for channel measurement between the terminal and a base station; determining a first size of multiple spreading resource blocks configured in a second two-dimensional (2D) domain based on a result of the channel measurement; reporting information indicating the first size of the multiple spreading resource blocks to the base station; and performing a communication procedure based on the multiple spreading resource blocks, wherein when the communication procedure is a transmission procedure, data symbols in a first 2D domain are spread to the multiple spreading resource blocks configured in the second 2D domain, and when the communication procedure is a reception procedure, the multiple spreading resource blocks configured in the second 2D domain are despread to data symbols in the first 2D domain.

The operation method may further comprise receiving, from the base station, an indicator approving application of the first size of the multiple spreading resource blocks reported to the base station, wherein when the indicator is received, the communication procedure may be performed based on the multiple spreading resource blocks having the first size.

The operation method may further comprise receiving, from the base station, an indicator rejecting application of the first size of the multiple spreading resource blocks reported to the base station, wherein when the indicator is received, the communication procedure may be performed based on the multiple spreading resource blocks having a second size, and the second size may be a size of multiple spreading resource blocks used in another communication procedure performed before the communication procedure.

The operation method may further comprise receiving, from the base station, information of candidate sizes of the multiple spreading resource blocks, wherein the first size is selected from among the candidate sizes.

The operation method may further comprise receiving, from the base station, configuration information for reporting the information indicating the first size of the multiple spreading resource blocks, wherein the configuration information may include at least one of transmission periodicity information and transmission occasion information, and the information indicating the first size of the multiple spreading resource blocks may be transmitted using resources indicated by the configuration information.

According to the present disclosure, information bits within a transport block may be transmitted/received using a modulation/demodulation method and a channel equalization method of a 2D multi-resource block spreading-based multi-carrier waveform. In this case, a diversity gain of a channel experienced by each data symbol in a codeword may be improved, and interference between data symbols according to multiplexing due to channel spreading may be appropriately limited. The modulation operation and the channel equalization operation of a multi-carrier wave may be performed for each 2D spreading resource block. In this case, a reception processing delay can be reduced, and when a turbo channel equalization operation is additionally performed, a bit error rate (BER), symbol error rate (SER), and/or block error rate (BLER) can be further reduced. Accordingly, the reception performance of the communication system can be improved.

DETAILED DESCRIPTION OF THE EMBODIMENTS

Figure 1:
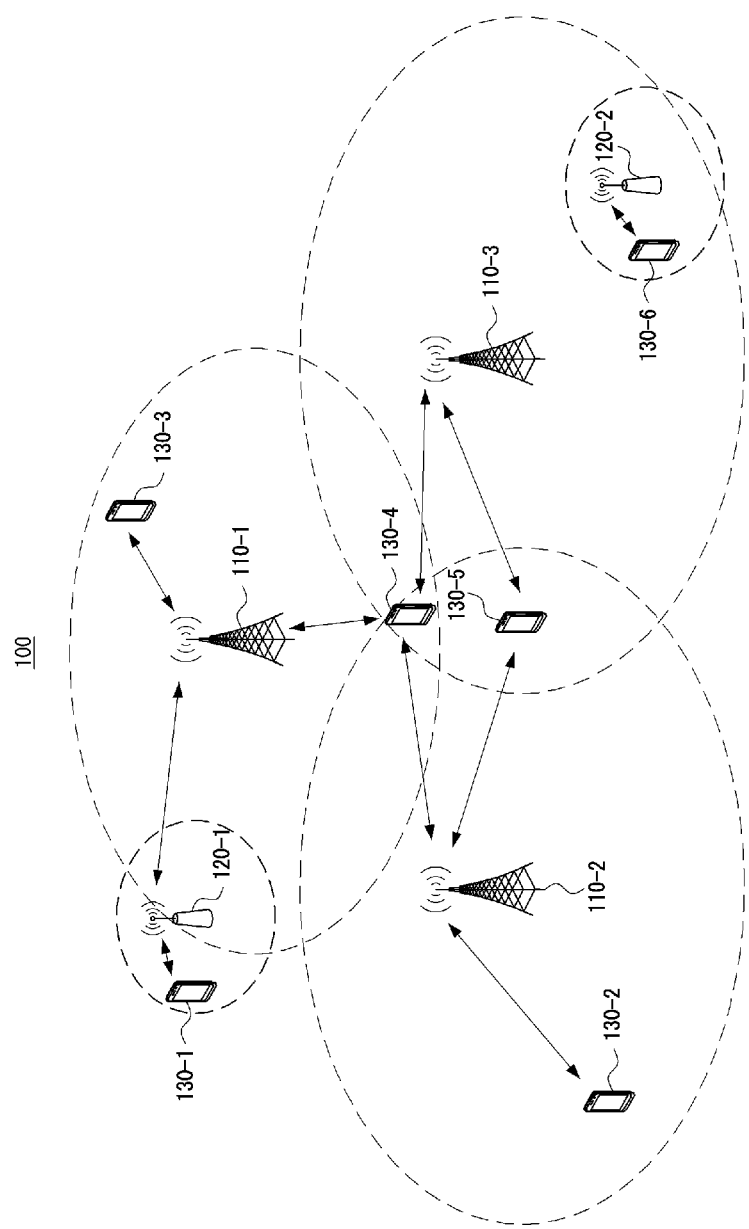
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated descriptions thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
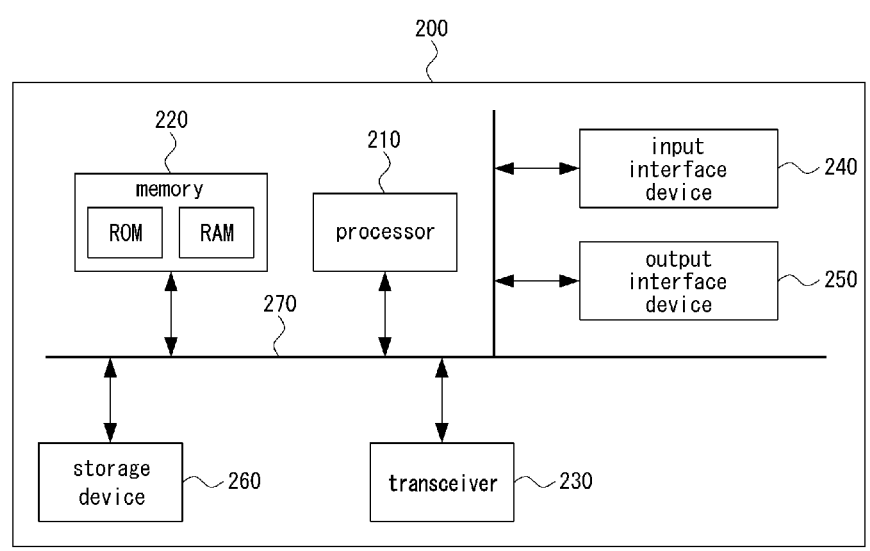
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

A transmitter may generate a modulated signal (hereinafter, referred to as 'modulation symbol') by performing a modulation operation on a signal (e.g., data symbol, pilot symbol, reference signal, etc.), and transmit the modulation signal to a receiver by using antenna(s) and/or emitter(s). In exemplary embodiments, when the transmitter is a base station, the receiver may be a terminal, and when the transmitter is a terminal, the receiver may be a base station or another terminal. The receiver may receive the signal from the transmitter by using antenna(s) and/or collector(s), and restore a transmission signal transmitted by the transmitter by performing a demodulation operation on the received signal. The transmission signal may be a desired signal that the transmitter intends to transmit.

The transmission signal may be transmitted on a transmission waveform through a channel or a medium. The transmission signal (e.g., original signal) transmitted by the transmitter may be restored by demodulating the received signal by using a reception waveform related to the transmission waveform.

In a broadband communication system, the OFDM scheme or OFDMA scheme may be used. When the OFDM scheme or OFDMA scheme is used, data symbols (e.g., modulation symbols) may be mapped to two-dimensional (2D) time-frequency resources. The above-described resource mapping operation may include an operation of mapping the data symbols only to time domain resources and/or an operation of mapping the data symbols only to frequency domain resources. In the time domain, the 2D time-frequency resources may be configured in units of symbols, and in the frequency domain, the 2D time-frequency resources may be configured in units of subcarriers. In case of an ideal channel, the data symbols transmitted in 2D time-frequency resources may be orthogonal to each other.

The signal (e.g., modulation signal, transmission signal) transmitted from the transmitter may undergo a delay spread channel, a Doppler spread channel, a frequency selective channel, and/or a time selective channel. In this case, orthogonality of data symbols transmitted through different resources may be damaged. When data symbols are transmitted in 2D time-frequency resources, a channel of the 2D time-frequency resources may be deteriorated due to fading. In this case, a channel gain value may be reduced, and it may be difficult to successfully detect or decode data symbols having the reduced channel gain value.

In exemplary embodiments, modulation/demodulation methods and channel equalization methods for a multi-carrier wave based on 2D multi-resource block spreading (e.g., multi-resource group) will be described. A unit of the spreading may be a 2D resource block (e.g., 2D resource group). The resource block may be referred to as 'resource group', 'spreading resource block', or 'spreading resource group'. In order to obtain a diversity gain experienced by each data symbol within a codeword in a time-varying multipath channel and to limit excessive interference between data symbols, different data symbols belonging to different 2D spreading resource blocks may be configured to undergo selective channels. In this case, a diversity gain by a channel encoding operation may be additionally obtained, and accordingly, a channel capacity, data rate, and/or frequency efficiency may be improved. In addition, a bit error rate (BER), symbol error rate (SER), block error rate (BLER), packet error rate (PER), and/or frame error rate (FER) may be reduced. In addition, since an operation for spreading to multiple resource blocks (or an operation for despreading from the multiple resource blocks) is performed, transmission/reception processing delay may be alleviated. A time-varying multi-path channel may include a static channel and/or a single-path channel. A codeword may be generated by concatenating a plurality of code blocks. In addition, for a transmission/reception operation in a communication system to which the multi-block spreading-based multi-carrier wave is applied, a method for selecting and/or setting a (2D) spreading resource block size, and a downlink and/or uplink allocation method for transmission of a physical downlink shared channel (PDSCH) or a physical uplink shared channel (PUSCH) will be described.

A codeword may be generated by performing a channel encoding operation and a modulation operation on information bits within a transport block. Data symbols within the codeword may be spread within a 2D spreading resource group, and each data symbol spread within the 2D spreading resource group may be transmitted through a multi-carrier. That is, a multi-carrier modulation operation for each data symbol may be performed. The receiver may receive a signal from the transmitter, and may obtain demodulated symbols (also referred to as 'demodulation symbols') by performing a multi-carrier demodulation operation on the received signal. The receiver may despread the demodulation symbols spread within the 2D spreading resource group.

In order to compensate for a distortion of the received signal due to a delay-spread channel and/or a Doppler-spread channel, the receiver may perform a channel equalization operation after performing the multi-carrier demodulation operation. Alternatively, the receiver may perform the channel equalization operation after performing the multi-carrier demodulation operation and the despreading operation. Thereafter, the receiver may perform a de-mapping operation on each data symbol. Coded bits resulting from the de-mapping operation may be input to a channel decoder. The channel decoder may support a de-interleaving function. A decoding operation on the coded bits may be performed in the channel decoder of the receiver. When the decoding operation fails, an interleaving operation for log-likelihood ratios (LLRs) and/or extrinsic LLRs for outputs (e.g., coded bits) of the channel decoder may be performed. A channel equalization operation for a result of the interleaving operation and a de-mapping operation of data symbols may be performed. The output coded bits may be input back to the channel decoder, so that a decoding operation on the corresponding coded bits may be performed. The above-described operation may be iterated until the decoding operation is successful within the maximum number of turbo iterations. The terminal may perform a turbo channel equalization operation. In this case, according to the capability of the terminal, the base station may control a channel state information (CSI) feedback operation and/or a hybrid automatic repeat request (HARQ) feedback operation.

In exemplary embodiments, a multiplexing operation for transport blocks (or codewords corresponding to the transport blocks) for one user (e.g., one terminal) and/or a multiple access (MA) operation for multiple users (e.g., multiple terminals) may be considered.

The transmitter may generate data symbols according to the following procedures. A transport block (TB) composed of information bits may be input to a channel coding block of the transmitter. In the channel coding block, a channel encoding operation for the transport block may be performed based on a modulation and coding scheme (MCS) level. Coded bits resulting from the channel encoding operation may be output from the channel coding block. One or more operations below may be performed in the channel coding block.

- Calculation and addition of cyclic redundancy check (CRC) bits for the transport block
- Code block segmentation operation for the transport block when the size of the transport block exceeds a threshold. The transport block to which the CRC bits are added may be segmented into a plurality of code blocks.
- Calculation and addition of CRC bits for each code block
- Channel encoding operation for each code block
- Rate matching (RM) operation and/or HARQ processing operation for each code block
- Bit interleaving operation
- Code block concatenation operation, i.e., a concatenation operation on coded bits of a plurality of code blocks When the transport block is not segmented into a plurality of code blocks, calculation and/or addition of CRC bits for each code block may not be required. Function blocks after the channel coding block may perform processing on the transport block to which the CRC bits are added. A concatenation operation on the last code block may not be required. A function block may mean a physical entity or a logical entity that performs a corresponding function. The function (e.g., operation) of the function block may be controlled by a processor. In the rate matching procedure, a puncturing operation, a shortening operation, and/or a repetition operation for the coded bits that are outputs of the channel encoding may be performed, so that a code rate may be adjusted. The channel encoding operation may be performed based on various channel encoding schemes. The various channel encoding schemes may include a turbo code scheme, a low-density parity-check (LPDC) code scheme, a polar code scheme, and the like. A scrambling operation (e.g., bit-level scrambling operation) may be performed on the coded bits that are the outputs of the channel coding block. A result of the scrambling operation may be input to a modulation/constellation mapper. The modulation/constellation mapper may output data symbols by performing a data modulation process.

In exemplary embodiments, each set of data symbols that are a result of performing the channel encoding operation and the data modulation operation for each transport block may be referred to as a codeword. For example, one transport block may be regarded as having one-to-one correspondence with one codeword.

The transmitter may perform the following additional procedure(s) on the data symbols (or symbols spread in second 2D domain resources) for multi-antenna transmission. In exemplary embodiments, a domain may mean a region. The transmitter may map the data symbols (or symbols spread in the second 2D domain resources) belonging to a codeword(s) to layer(s). Accordingly, in a transmission procedure of a plurality of transport blocks, each of the codewords may be mapped to different layers. The data symbols belonging to different codewords (or symbols spread in the second 2D domain resources) may be limited to be mapped only to different layers. The data symbols mapped to each layer (or symbols spread in second 2D domain resources) may be spread to each antenna port through multi-antenna preprocessing.

The transmitter may perform a 2D (partial) spreading multi-carrier modulation operation in baseband, and may convert output signals of the 2D (partial) spreading multi-carrier modulation operation to analog signals through a digital-to-analog converter (DAC). The transmitter may transmit the analog signals to an analog/RF unit, and may transmit an output of the analog/RF unit to the receiver through antenna(s).

The receiver may receive RF band signals from the transmitter through reception antenna(s), convert the RF band signals into digital signals through an analog/RF unit and an analog-to-digital converter (ADC), and may perform a 2D (partial) despreading multi-carrier demodulation operation for the digital signals in baseband.

The receiver may decode data symbols by performing the following procedure(s) on the data symbols (e.g., detected data symbols) that are a result of the 2D (partial) despreading multi-carrier demodulation operation. The detected data symbols may be input to a modulation/constellation de-mapper. The modulation/constellation de-mapper may output LLRs for coded bits. A descrambling operation for the LLRs of the coded bits may be performed, and a result of the descrambling operation may be input to a channel decoding block. The channel decoding block may output information bits and a CRC verification result of a transport block by performing a channel decoding operation. If the CRC verification result for the transport block is successful, it may be determined that the channel decoding operation for the transport block is successful. If the CRC verification for the transport block fails, it may be determined that the channel decoding operation for the transport block has failed.

When one codeword includes a plurality of code blocks, the channel decoding block may perform segmentation/deconcatenation on the plurality of code blocks. For example, the channel decoding block may perform one or more of the following operations.

De-interleaving operation for each code block (e.g., bit-level de-interleaving operation)

Rate de-matching operation for each code block

LLR combining operation for each code block

Channel decoding operation for each code block

CRC verification for each code block

Code block concatenation/desegmentation operation. That is, concatenation operation of decoded bits for each code block CRC verification for a transport block When one codeword does not include a plurality of code blocks (i.e., when one codeword includes one code block), the code block desegmentation operation may be unnecessary, and the remaining function blocks for the codeword may be performed. In this case, the CRC verification operation for each code block and the code block concatenation operation may be unnecessary, and whether the CRC verification result is successful may be identified based on the information bits and CRC bits of the transport block that are outputs of the channel decoding operation.

In downlink communication, the transmitter may be a base station, repeater (or relay), transmission point (TP), or transmission and reception point (TRP), and the receiver may be a terminal or user equipment (UE). In uplink communication, the transmitter may be a terminal or a user terminal, and the receiver may be a base station, repeater (or relay), TP, or TRP. In sidelink communication, the transmitter and the receiver may be different terminals.

Parameter(s) used in the modulation operation and the demodulation operation may be defined as shown in Table 1 below.

TABLE 1

| Parameter | Description |
|---|---|
| $M_g$ | Number of first-dimensional grid points in the g-th resource group in the first 2D domain |
| $N_g$ | Number of second-dimensional grid points in the g-th resource group in the first 2D domain |
| M | Number of first-dimensional grid points in the second 2D domain (e.g., number of subcarriers in a multi-carrier symbol) |
| N | Number of second-dimensional grid points in the second 2D domain (e.g., number of multi-carrier symbols in a transmission time interval (TTI), slot, mini-slot, subframe, or frame) |
| $\overline{M}$ | Length of a transmission MC pulse, M may be equal to or greater than M. |
| $\tilde{M}$ | Length of a reception MC pulse, $\tilde{M}$ may be equal to or greater than $\overline{M}$. |

In addition, parameter(s) used in the modulation operation may be defined as shown in Table 2 below.

TABLE 2

| Parameter | Description |
|---|---|
| $[A]_{M \times N}$ | M × N matrix |
| $[A]_{k, l}$ | Element in the k-th row and l-th column in the matrix A |
| $[a]_{M \times 1}$ and $[a]_M$ | Vector having a length of M |
| $[a]_k$ | k-th element in the vector a |
| | $1 := \sqrt{-1}$ |
| | $[K] := \{0, 1, \ldots, K - 1\}$ for $K \in \mathbb{N}$ |

In exemplary embodiments, it may be assumed that an index of each row and each column in a matrix or vector starts from 0. In each of discrete Fourier transform (DFT), inverse DFT (IDFT), Walsh-Hadamard transform (WHT), and inverse WHT (IWHT), a normalization operation may be applied so that the magnitudes of input signals and output signals do not change.

[Multi-2D Resource Block Spreading-Based Multi-Carrier Waveform Modulation/Demodulation Method]

The multi-2D resource block spreading-based multi-carrier waveform may include a single 2D resource block spreading-based multi-carrier waveform. That is, the number of resource blocks (or groups) for 2D spreading may be set to one.

Multi-2D resource block spreading-based multi-carrier waveform modulation

Figure 3:
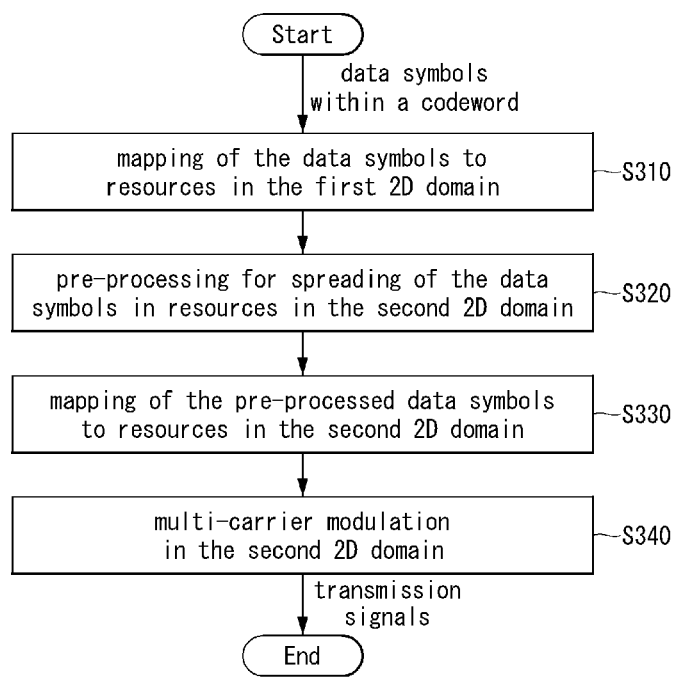
FIG. 3 is a flowchart illustrating a first exemplary embodiment of a method for modulating a multi-carrier waveform based on multi-2D resource block spreading.

FIG. 3 is a flowchart illustrating a first exemplary embodiment of a method for modulating a multi-carrier waveform based on multi-2D resource block spreading.

Referring to FIG. 3, a modulation operation of data symbols included within one codeword may be performed as follows. The modulation operation of the data symbols may be performed at a transmitter. The transmitter may map the data symbols within one codeword to $N_G$ 2D spreading resource blocks in the first 2D domain (S310). $N_G$ may be a natural number equal to or greater than 1. In order to spread the data symbols mapped to each 2D spreading resource block in the first 2D domain to resources in each 2D spreading resource block in the second 2D domain, the transmitter may perform a pre-processing operation on the data symbols for each resource block (S320). For example, the pre-processing operation may include a discrete symplectic Fourier transform (DSFT) operation (or a DFT for a first dimension and an inverse DFT (IDFT) for a second dimension) and/or a transmission (TX) windowing-related operation after the corresponding IDFT operation. For another example, the pre-processing operation may include a Walsh-Hadamard transform (WHT) operation for the first dimension and an inverse WHT (IWHT) operation for the second dimension and/or a TX windowing-related operation after the corresponding IWHT operation. The transmitter may map data symbols pre-processed for each (spreading) resource block in the first 2D domain to resources in each spreading resource block in the second 2D domain. The transmitter may perform a multi-carrier modulation operation on the data symbols spread in the second 2D domain resources.

The first 2D domain may be a delay-Doppler domain, a Doppler-delay domain, or another type of 2D domain. The exemplary embodiments will be described assuming that the first 2D domain is a delay-Doppler domain. In this case, the first dimension in the first 2D domain may be a delay domain, and the second dimension in the first 2D domain may be a Doppler domain.

The second 2D domain may be a frequency-time domain, a time-frequency domain, or another type of 2D domain. The exemplary embodiments will be described assuming that the second 2D domain is a frequency-time domain. In this case, the first dimension in the second 2D domain may be a frequency domain, and the second dimension in the second 2D domain may be a time domain.

Different (spreading) resource blocks in the first 2D domain may have different independent resource grids. In the second 2D domain, different spreading resource blocks may share a common grid. Each (spreading) resource block in the first 2D domain may correspond to a different spreading resource block in the second 2D domain. The size of each (spreading) resource block in the first 2D domain may be the same as the size of each corresponding spreading resource block in the second 2D domain.

In the first 2D domain, (spreading) resource blocks may be sequentially indexed, and data symbols may be mapped in the order of (spreading) resource block indexes. When the size of the (spreading) resource block is K, a first set of K data symbols may be mapped to a (spread) resource block #0, and a second set of K data symbols may be mapped to a (spreading) resource block #1. The above-described mapping operation may be sequentially performed according to the indexes of the (spreading) resource blocks. A rule of the above-described mapping operation may be preconfigured. For example, a rule of the above-described mapping operation may be preconfigured between the base station and the terminal. In the mapping procedure of the data symbols in each (spreading) resource block in the first 2D domain, the data symbols may be first mapped to a delay axis, and then mapped to a Doppler axis. Alternatively, the data symbols may be mapped first to the Doppler axis and then to the delay axis. A rule of the above-described mapping operation may be preconfigured. For example, the base station may configure a rule of the mapping operation to the terminal.

In the procedure of mapping the (spreading) resource block in the first 2D domain to resources in the second 2D domain, the (spreading) resource block may be mapped first on the frequency axis, and then on the time axis. With this operation, the processing delay may be relatively small. Alternatively, the (spreading) resource block may be mapped first on the time axis and then on the frequency axis. A rule of the above-described mapping operation may be preconfigured. For example, the base station may configure the rule of the mapping operation to the terminal. The multi-carrier modulation operation may be performed based on the CP-OFDM, W-OFDM, PS-OFDM, F-OFDM, and/or successive beamforming (SBF)-OFDM scheme. The data symbols and/or the spread data symbols may be transmitted by being multiplexed with reference signals in the first 2D domain and the second 2D domain.

A modulation signal for one codeword may be expressed as a modulation signal matrix S of $\overline{M} \times N$ as shown in Equation 1 below.

TABLE 1

$$S|_{\bar{M}\times N} := \sum_{g\in[N_G]} S^{(g)} = G_T F_M^H \sum_{g\in[N_G]} M_f^{(g)} Y^{(g)} M_t^{(g)}$$

In Equation 1, $$S^{(g)}(:=$$
$$G_T F_M^H M_f^{(g)} Y^{(g)} M_t^{(g)} \leftrightarrow vec(S^{(g)}) = ((M_t^{(g)}) \otimes (G_T F_M^H M_f^{(g)}))vec(Y^{(g)}))$$

may refer to a signal matrix of signals multi-carrier-modulated after being spread to resources in the g-th spreading resource group. $\bar{M}$, which is the number of rows in the signal matrix, may refer to the total number of subcarriers per multi-carrier (MC) symbol (or a FFT size or the number of frequency domain resources). N may refer to the number of multi-carrier symbols (or the number of time domain resources) within a transmission time interval (TTI).

$M_f^{(g)}$ may refer to a matrix for mapping symbols pre-processed after being mapped to the resources in the g-th spreading resource group in the first 2D domain (or, $Y^{(g)}$ composed of the pre-processed symbols) to the first-dimensional resources in the g-th spreading resource group in the second 2D domain. $M_t^{(g)}$ may refer to a matrix for mapping symbols pre-processed after being mapped to the resources in the g-th spreading resource group in the first 2D domain (or, $Y^{(g)}$ composed of the pre-processed symbols) to the second-dimensional resources in the g-th spreading resource group in the second 2D domain.

$M_f^{(g)}$ may be a matrix in which the size of resource mapping is $M\times M_g(\cdot M)$ in the first-dimensional frequency domain of the second 2D domain. When an element located in the i-th row (i∈[$M_g$]) of each column of an input matrix ($M_f^{(g)}$ is multiplied from the left side of the input matrix) is mapped to an element located in the j-th row (j∈[M]) of each column of an output matrix, $[M_f^{(g)}]_{j,i}$ may have a value of 1, and other elements may have a value of 0.

$M_t^{(g)}$ may be a matrix in which the size of resource mapping is $N_g(\leq N)\times N$ in the second-dimensional time domain of the second 2D domain. When an element located in the i-th column (i∈[$N_g$]) of each row of an input matrix ($M_t^{(g)}$ is multiplied from the right side of the input matrix) to an element located in the j-th column (j∈[N]) of each row of an output matrix, In this case, $[M_t^{(g)}]_{i,j}$ may have a value of 1, and other elements may have a value of 0.

$G_T$ may mean a transmission pulse shaping matrix having a size of $\bar{M}(\geq M)\times M$. $G_T$ may include a CP insertion function and/or an oversampling function as a part of transmission pulse shaping. When a CP is inserted or when oversampling is performed, $\bar{M}>M$ may be established.

When a CP having a length of $M_{CP}(:=\bar{M}-M)$ is inserted and a square pulse is applied, $G_T$ may be defined as in Equation 2 below.

$$G_T = \begin{bmatrix} 0_{M_{CP}\times(M-M_{CP})} I_{M_{CP}} \\ I_M \end{bmatrix} \quad [\text{Equation 2}]$$

$F_M^H$ may mean an M-point IDFT matrix for a column vector (or each column vector of the matrix). By accumulating $S^{(g)}$ for all g's, the modulation signal matrix S may be obtained. Symbols mapped and pre-processed in each spreading resource group in the second 2D domain may be mapped to resources in all spreading resource groups in the second 2D domain (e.g., $\sum_{g\in[N_g]} M_f^{(g)} Y^{(g)} M_t^{(g)}$ in the above equation). Thereafter, a multi-carrier modulation operation (e.g., an operation of multiplying $G_T F_M^H$ in the above-described equation or an operation of performing IFFT and performing transmission pulse shaping with the same function) may be commonly performed.

$$Y^{(g)}(:=W_{T,f}^{(g)} F_{M_g} M_d^{(g)} X^{(g)} M_D^{(g)} F_{N_g}^H W_{T,t}^{(g)} \leftrightarrow vec(Y^{(g)}) =$$
$$((M_D^{(g)} F_{N_g}^H W_{T,t}^{(g)})^T \otimes (W_{T,f}^{(g)} F_{M_g} M_d^{(g)})^T vec(X^{(g)}))$$

may be a $M_g\times N_g$ matrix composed of symbols mapped and pre-processed in the resources in the g-th spreading resource group in the first 2D domain. $M_g$ may refer to the number of delay domain resources in the g-th spreading resource group in the first 2D domain, and $N_g$ may refer to the number of Doppler domain resources in the g-th spreading resource group in the first 2D domain. In exemplary embodiments, the delay domain resource may be referred to as a delay resource, and the Doppler domain resource may be referred to as a Doppler resource.

$M_g$ and/or $N_g$ may be set to different values for each spreading resource group in the first 2D domain. In the exemplary embodiments below, it may be assumed that $M_g$ and/or $N_g$ are set to the same value.

$X^{(g)}$ (: =$vec^{-1}(x^{(g)})$) may be a $M'_g\times N$ matrix composed of data symbols to be mapped to resources in the g-th spreading resource group in the first 2D domain. A vector $x^{(g)}$ vectorized from the $M'_g\times N'_g$ matrix may be defined a sub-vector constituting a codeword vector $x(:=[(x^{(0)})^T (x^{(1)})^T \ldots (x^{(N_g-1)})^T]^T)$.

$M_d^{(g)}$ may refer to a matrix mapping the g-th data symbol matrix $X^{(g)}$ (or vector $x^{(g)}$) to the first-dimensional resources in the g-th spreading resource group in the first 2D domain. $M_D^{(g)}$ may refer to a matrix mapping the g-th data symbol matrix $X^{(g)}$ (or vector $x^{(g)}$) to the second-dimensional resources in the g-th spreading resource group in the first 2D domain.

$M_d^{(g)}$ may be a matrix having a size of $M_g(\geq M'_g)\times M'_g$ mapped to delay domain resources that are the first-dimensional resources in the first 2D domain. When an element located in the i-th row (i ∈ [$M_g$]) of each column of an input matrix ($M_d^{(g)}$ is multiplied from the left side of the input matrix) is mapped to an element located in the j-th row (j∈[$M_g$]) of each column of an output matrix, $[M_d^{(g)}]_{j,i}$ may have a value of 1, and other elements may have a value of 0.

$M_D^{(g)}$ may be a matrix having a size of $N'_g\times N_g(N'_g)$ mapped to Doppler domain resources that are the second-dimensional resources in the first 2D domain. When an element located in the i-th column (i∈[$N'_g$]) of each row of an input matrix ($M_D^{(g)}$ is multiplied from the right side of the input matrix) is mapped to an element located in the j-th column (j∈[$N_g$]) of each row of an output matrix, $[M_D^{(g)}]_{i,j}$ may have a value of 1, and other elements may have a value of 0.

$F_{M_g}$ may mean a $M_g$-point DFT matrix for a column vector (or each column vector of the matrix). $F_{N_g}^H$ may mean a $N_g$-point IDFT matrix for a row vector (or each row vector of the matrix). $F_{M_g}$ may mean a $M_g$-point WHT matrix for a column vector (or each column vector of the matrix). $F_{N_g}^H$ may mean a $N_g$-point IWHT matrix for a row vector (or each row vector of the matrix).

$W_{T,f}^{(g)}$ may mean a transmission windowing matrix in the first dimension for the g-th spreading resource group of the first 2D domain. The size of the transmission windowing matrix may be $M_g \times M_g$. $W_{T,t}^{(g)}$ may mean a transmission windowing matrix in the second dimension for the g-th spreading resource group of the first 2D domain. The size of the transmission windowing matrix may be $N_g \times N_g$.

$W_{T,f}^{(g)}$ may be a diagonal matrix. In the diagonal matrix, each diagonal component may be each transmission window coefficient in the first dimension of the first 2D domain. The length of the corresponding transmission window may be $M_g$. $W_{T,f}^{(g)}$ may be a diagonal matrix. In the diagonal matrix, each diagonal component may be each transmission window coefficient in the second dimension of the first 2D domain. The length of the corresponding transmission window may be $N_g$.

A vector s(: =vec(S)) vectorized from the modulation signal matrix S may be expressed for the input codeword vector x given as in Equation 3 below.

$$s(:=[s_0^T\ s_1^T\ \ldots\ s_{N-1}^T]^T) = \quad \text{[Equation 3]}$$
$$b\text{diag}(T^{(0)}, T^{(1)}, \ldots, T^{(N_G-1)})x = \sum_{g\in[N_G]} T^{(g)}x^{(g)}$$

In Equation 3, $$b\text{diag}(A_0, A_1, \ldots, A_{K-1}) := \begin{pmatrix} \begin{bmatrix} A_0 & & & \\ & A_1 & & \\ & & \ddots & \\ & & & A_{K-1} \end{bmatrix} \end{pmatrix}$$

may mean a block diagonal matrix in which each diagonal sub-matrix is of $A_{k\in[K]}$. Equation 4 below may be defined.

$$T_T^{(g)} := (M_D^{(g)} F_{N_g}^H W_{T,t}^{(g)} M_t^{(g)})^T \otimes (G_T F_M^H M_f^{(g)} W_{T,f}^{(g)} F_{M_g} M_d^{(g)}) \quad \text{[Equation 4]}$$

$\otimes$ may mean a Kronecker product. In the modulation procedure expressed by the above-described matrix operations, each function block may be implemented in a different form of outputting the same result as the corresponding matrix operations instead of the matrix operations. The above-described expression based on matrix operations may be for simply expressing the effects of a function between input and output in each function block mathematically. For example, a product with a DFT matrix may be processed by an FFT, and a product with an IDFT matrix may be processed by an IFFT. The multiplication with the transmission pulse shaping matrix $G_T$ may be performed by multiplying temporal samples of the modulated signal with respective corresponding coefficients of the pulse. When the CP insertion operation and/or the oversampling operation is performed for the transmission pulse shaping matrix, this may be performed as an operation of repeatedly extending the corresponding time samples. The resource mapping operation may be processed as an indexing (or mapping) operation rather than the actual matrix operation.

System model of a reception signal subjected to a time-varying multipath channel A modulation signal of each multi-carrier symbol within a TTI may undergo a time-varying multipath channel, and the modulation signal to which noise is added in a receiver may be expressed as Equation 5 below. In Equation 5, a magnitude may be expressed as a reception signal vector. The time-varying multipath channel may include a non-time-varying channel, a static channel, and/or a single-path channel.

$$r_n|_{n\in[N]} := H_n s_n + v_n = \quad \text{[Equation 5]}$$
$$H_n G_T F_M^H \sum_{g\in[N_G]} M_f^{(g)} W_{T,f}^{(g)} F_{M_g} M_d^{(g)} X^{(g)} M_D^{(g)} f_{N_g,n}^* w_{T,t,n}^{(g)} + v_n$$

In Equation 5, an interval of MC symbols may be assumed to be sufficiently long so that inter symbol interference (ISI) does not occur. If the interval of MC symbols is not long enough, interference from the previous MC symbol may be added. Additionally, other types of interference (e.g., inter-cell interference) may be added, but only noise may be assumed as an unwanted component in Equation 5 above.

The reception signal vectors for all MC symbols within the TTI may constitute a reception signal matrix $R(: = [r_0\ r_1\ \ldots\ r_{N-1}])$.

$H_n$ is a linear time-variant convolution matrix or a linear time-variant filtering matrix having a size of $M \times \overline{M}$ for reflecting the influence of the time-varying multipath channel. In the time-varying channel, each non-zero diagonal component may not be constant.

$$\tilde{M} := \overline{M} + L_H - 1 \quad \text{[Equation 6]}$$

Based on that a first delay index is 1, $L_H$ may mean a maximum delay length index. $w_{T,t,n}^{(g)} (:=[W_{T,t}^{(g)}]_{n,n})$ may mean the n-th diagonal component of $W_{T,t}^{(g)}$. $v_n$ may be a noise vector in the n-th MC symbol. $v_n$ may be assumed to be white Gaussian noise having a statistic of $E[v_n v_n^H] = n_0 I_{\tilde{M}}$.

Demodulation signal in the second 2D domain of a multi-2D resource block spreading-based multi-carrier waveform In order to demodulate a reception signal, a procedure for acquiring time and frequency synchronization above a certain level may be required between a transmitter and a receiver. In addition to the synchronization procedure, time synchronization with a mini-slot, half-slot, slot, frame, and/or super frame. In the exemplary embodiments, it may be assumed that synchronization has been acquired through the above-described synchronization procedure before the demodulation operation.

The receiver may perform a multi-carrier demodulation operation on a signal received in each of the total N MC symbols within the TTI. The receiver may de-map the demodulated signal from resources of each of the total $N_G$ spreading resource blocks in the second 2D domain. The multi-carrier demodulation operation may be performed based on the CP-OFDM, W-OFDM, PS-OFDM, F-OFDM, and/or SBF-OFDM scheme.

After the multi-carrier demodulation operation is performed in the g-th spreading resource group in the second 2D domain, a signal matrix ii(g) de-mapped from the corresponding resources may be defined as in Equation 7 below.

$$\tilde{Y}^{(g)}|_{g\in[N_g]} := (M_f^{(g)})^T F_M G_R R(M_t^{(g)})^T \leftrightarrow vec(\tilde{Y}^{(g)})|_{g\in[N_g]} = \quad \text{[Equation 7]}$$
$$(M_t^{(g)} \otimes ((M_f^{(g)})^T F_M G_R)) vec(R)$$

In Equation 7, $G_R$ may mean a reception pulse shaping matrix having a size of M×M̃, and $G_R$ may include a CP removal function and/or a downsampling function as a part of reception pulse shaping. When a CP of length $M_{CP}$ is removed and a square pulse is applied by removing the last $L_H$−1 time samples received as delayed by a channel delay, $G_R$ may be defined as Equation 8 below.

$$G_R := [_{M \times M_{CP}} I_M 0_{M \times (L_H - 1)}]$$ [Equation 8]

The receiver may perform a channel equalization operation in the first 2D domain for each spreading resource group or across the spreading resource groups in the second 2D domain. The channel equalization operation will be described later.

In the demodulation procedure expressed by the above-described matrix operations, each function block may be implemented in a different form of outputting the same result as the corresponding matrix operations instead of the matrix operations. The above-described expression based on matrix operations may be for simply expressing the effects of a function between input and output in each function block mathematically. For example, a product with a DFT matrix may be processed by an FFT, and a product with an IDFT matrix may be processed by an IFFT. The multiplication with the reception pulse shaping matrix $G_R$ may be performed by multiplying temporal samples of the modulated signal with respective corresponding coefficients of the pulse. When the CP removal operation and/or downsampling operation is performed on the reception pulse shaping matrix, this may be performed as an operation of taking only some time samples or an operation of accumulating periodically repeated time samples. The resource mapping operation may be processed as an indexing operation (or mapping operation) rather than the actual matrix operation.

Demodulation signal in the first 2D domain of a multi-2D resource block spreading-based multi-carrier waveform After performing the multi-carrier demodulation operation and the de-mapping operation on the second 2D domain, the receiver may perform a channel equalization operation in the second 2D domain when necessary. The receiver may perform a post-processing operation on a result of the channel equalization operation. The input of the post-processing operation for despreading may be the result of the channel equalization operation. The receiver may perform the post-processing operation on each of the total of $N_G$ spreading resource groups in the first 2D domain. For example, the post-processing operation may include a reception (RX) windowing-related operation and an inverse DSFT (IDSFT) operation after the reception windowing-related operation (or, an IDFT operation for the first dimension and a DFT operation for the second dimension) or the IDSFT operation without the reception windowing-related operation. For another example, the post-processing operation may include a reception windowing-related operation and an IWHT operation for the first dimension and an WHT operation for the second dimension, or the IWHT operation for the first dimension and the WHT operation for the second dimension without the reception windowing-related operation. Then, the receiver may perform a de-mapping operation for resources in each spreading resource block in the first 2D domain.

A demodulation signal matrix $\tilde{X}^{(g)}$ having a size of $M'_g \times N'_g \times N$ for the g-th spreading resource group in the first 2D domain may be defined as in Equation 9 below.

$$\tilde{X}^{(g)}|_{g \in [N_g]} := (M_d^{(g)})^T F_{M_g}^H W_{R,f}^{(g)} \tilde{Y}^{(g)} W_{R,t}^{(g)} F_{N_g} (M_D^{(g)})^T$$ [Equation 9]

$$\leftrightarrow vec(\tilde{X}^{(g)})|_{g \in [N_g]} :=$$

$$((W_{R,t}^{(g)} F_{N_g} (M_D^{(g)}))^T \otimes ((M_d^{(g)})^T F_{M_g}^H W_{R,f}^{(g)})) vec(\tilde{Y}^{(g)})$$

$$\leftrightarrow vec(\tilde{X}^{(g)})|_{g \in [N_g]} := T_R^{(g)} vec(R)$$

When the channel equalization operation in the first 2D domain is performed, $\tilde{Y}^{(g)}$ in Equation 9 may be replaced with $\hat{Y}^{(g)}$, which will be described later. $W_{R,f}^{(g)}$ may mean a reception windowing matrix in the first dimension for the g-th spreading resource group of the first 2D domain. The size of the reception windowing matrix may be $M_g \times M_g$. $W_{R,t}^{(g)}$ may mean a reception windowing matrix in the second dimension for the g-th spreading resource group of the first 2D domain. The size of the reception windowing matrix may be $N_g \times N_g$. $W_{R,f}^{(g)}$ may be a diagonal matrix. Each diagonal component of the diagonal matrix may be each reception window coefficient in the first dimension of the first 2D domain. The length of the corresponding reception window length may be $M_g$. $W_{R,t}^{(g)}$ may be a diagonal matrix. Each diagonal component of the corresponding diagonal matrix may be each transmission window coefficient in the second dimension of the first 2D domain. The length of the corresponding reception window may be $N_g$.

$$T_R^{(g)} := ((W_{R,t}^{(g)} F_{N_g} (M_D^{(g)}))^T \otimes ((M_d^{(g)})^T F_{M_g}^H W_{R,f}^{(g)}))$$ [Equation 10]

$$(M_t^{(g)} \otimes ((M_f^{(g)})^T F_M G_R)) = (((M_t^{(g)})^T W_{R,t}^{(g)} F_{N_g} (M_D^{(g)})^T)^T \otimes$$

$$((M_d^{(g)})^T F_{M_g}^H W_{R,f}^{(g)} (M_f^{(g)})^T F_M G_R))$$

In the demodulation procedure expressed by the above-described matrix operations, each function block may be implemented in a different form of outputting the same result as the corresponding matrix operations instead of the matrix operations. The above-described expression based on matrix operations may be for simply expressing the effects of a function between input and output in each function block mathematically. For example, a product with a DFT matrix may be processed by an FFT, and a product with an IDFT matrix may be processed by an IFFT. The resource mapping operation may be processed as an indexing operation (or mapping operation) rather than the actual matrix operation.

Figure 4:
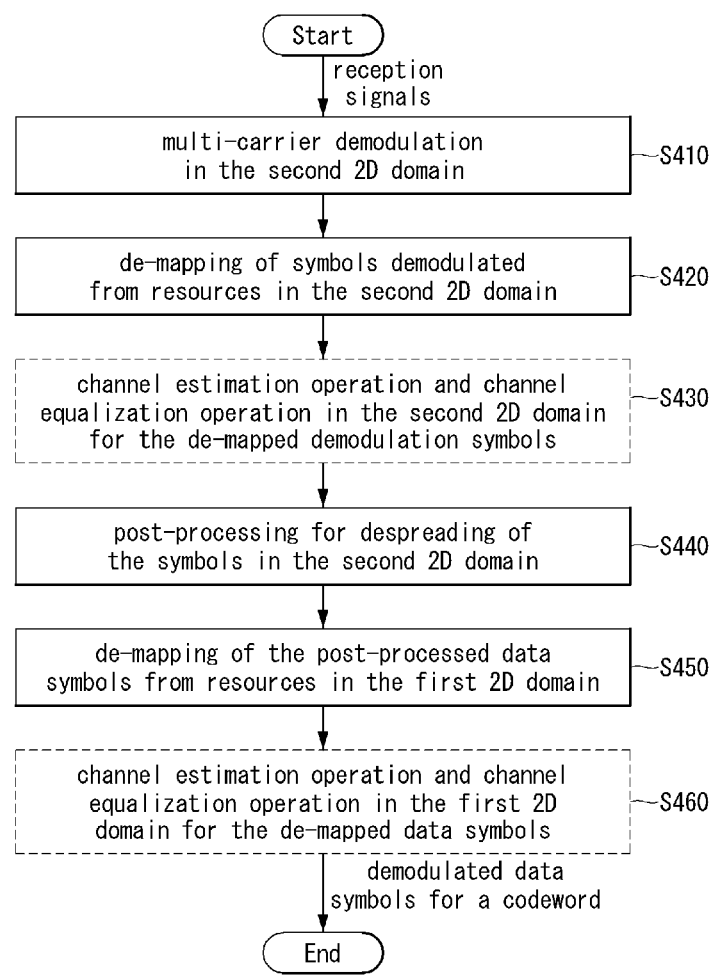
FIG. 4 is a flowchart illustrating a second exemplary embodiment of a method for demodulating a multi-carrier waveform based on multi-2D resource block spreading.

FIG. 4 is a flowchart illustrating a second exemplary embodiment of a method for demodulating a multi-carrier waveform based on multi-2D resource block spreading.

Referring to FIG. 4, a receiver may receive reception signal(s) from a transmitter. The receiver may perform a multi-carrier demodulation operation on the reception signal(s) in the second 2D domain (S410). As a result of the multi-carrier demodulation operation, demodulated symbols (or demodulation symbols) may be generated. The receiver may perform a de-mapping operation for the demodulated symbols from the second 2D domain resources (S420). The receiver may perform a channel estimation operation and/or a channel equalization operation in the second 2D domain for the de-mapped and demodulated symbols (S430). The step S430 may be selectively performed.

The receiver may perform a post-processing operation for despreading symbols in the second 2D domain (S440). When the step S430 is performed, the post-processing operation for despreading the demodulated symbols on which the channel equalization operation has been performed may be performed. When the step S430 is not performed, the post-processing operation for despreading the demodulation symbols on which the de-mapping operation has been performed may be performed. The receiver may perform a de-mapping operation for the post-processed data symbols from the first 2D domain resources (S450). The receiver may perform a channel estimation operation and/or a channel equalization operation in the first 2D domain for the de-mapped data symbols (S460). The step S460 may be selectively performed.

[Method and Procedure for Selecting a Spreading Resource Block Size for a Multi-Block Spreading-Based Multi-Carrier]

In the exemplary embodiments, the operations of the base station may be applied identically or similarly to a repeater, the base station may be a serving base station of the terminal, and the terminal may mean a terminal group. Link allocation information may be downlink allocation information, uplink allocation, sidelink allocation information, and/or other types of allocation information. The signaling may be at least of signaling of system information, signaling of radio resource control (RRC) message, signaling of higher layer parameters, signaling of MAC CE (control element), or signaling of control information (e.g., downlink control information (DCI), uplink control information (UCI), and sidelink control information (SCI)). "A first communication node configures specific information to a second communication node" may mean "the first communication node transmits the specific information to the second communication node through the above-described signaling". "A first communication node configures a specific operation to a second communication node" may mean "the first communication node transmits configuration information for the specific operation to the second communication node through the above-described signaling". In a multi-block spreading-based multi-carrier, a method of spreading on a single spreading resource block may be used. For example, when a size of a resource region indicated by the resource allocation information in the second 2D domain is the same as a set spreading resource block size, a single spreading resource block may be used.

Method 3000: In the multi-block spreading-based multi-carrier modulation operation or demodulation operation of the terminal, the base station may select the size of the spreading resource block, and may signal information of the selected size of the spreading resource block to the terminal. The terminal (e.g., a transmitting terminal and/or a receiving terminal) may identify the size of the spreading resource block (hereinafter, referred to as 'spreading resource block size') through the signaling of the base station, and may perform the multi-block spreading-based multi-carrier modulation operation or demodulation operation based on the identified spreading resource block size. A method of setting the spreading resource block size will be described in Method 5000 to be described later.

Method 3100: In Method 3000, the base station may perform a channel measurement operation based on a signal received from the terminal, and may select the spreading resource block size based on a result of the channel measurement operation. The base station may configure the terminal to transmit a sounding reference signal (SRS) for the channel measurement operation, and the terminal may transmit the SRS to the base station according to the configuration of the base station. The base station may receive the SRS from the terminal based on the above-described configuration, and may perform a measurement operation on the SRS. The base station may select the spreading resource block size based on a result of the measurement operation on the SRS. The SRS may be transmitted in the first 2D domain (e.g., delay-Doppler domain) or the second 2D domain (e.g., frequency-time domain). "The SRS is transmitted in the first 2D domain" may mean that "the SRS is mapped to the first 2D domain, the SRS mapped to the first 2D domain is spread to the second 2D domain, and the SRS is transmitted in the second 2D domain". "The SRS is transmitted in the second 2D domain" may mean "the SRS mapped to the second 2D domain is transmitted without a processing operation related to the first 2D domain".

When the channel measurement operation is performed based on the SRS in the first 2D domain, the base station may select the spreading resource block size by using an instantaneous channel in the first 2D domain, a power of the instantaneous channel, or an average power of channel(s) measured based on a plurality of SRSs received within a measurement window. The measurement window may be preconfigured. For example, the base station may configure the measurement window to the terminal.

When the channel measurement operation is performed based on the SRS in the second 2D domain, the base station may measure the instantaneous channel in the second 2D domain and may transform the instantaneous channel into a channel in the first 2D domain. The base station may select the spreading resource block size by using the transformed channel, a power of the transformed channel, or an average power of channel(s) transformed into the first 2D domain based on a measurement result of a plurality of SRSs within a measurement window. The measurement window may be preconfigured.

The base station may configure periodic SRS transmission, aperiodic SRS transmission, and/or semi-persistent SRS transmission to the terminal for the channel measurement. Configuration information for SRS transmission (hereinafter referred to as 'SRS configuration information') may include information of SRS transmission resources (hereinafter referred to as 'SRS resource information'), SRS signal information (e.g., sequence generation information, comb index information, power boosting information, and/or waveform information), and/or information on the number of SRS ports.

In the case of SRS transmission configuration in the first 2D domain, the SRS resource information may include time domain resource information (e.g., offset for an occasion, transmission periodicity information, and/or time resource length information), frequency domain resource information (e.g., component carrier (CC) information, bandwidth part (BWP) information, start position information of a band for the SRS, SRS bandwidth information, and/or frequency hopping information), and/or delay-Doppler domain resource information (e.g., start position and length information of delay resources and/or start point and length information of Doppler resources). The delay-Doppler domain resource information may indicate a resource position in the delay-Doppler domain to which the resources allocated for the SRS in the frequency-time domain are spread.

The SRS transmitted in the first 2D domain may have an impulse-shaped waveform. For example, among allocated resources in the delay-Doppler domain, only a central resource may have a non-zero power, and resources other than the central resource may have a power of zero. Data symbols may be allocated to the resources with zero power. The SRS may have other types of waveforms.

The SRS configuration information may be signaled from the base station to the terminal through an RRC message. The terminal may obtain the SRS configuration information from the RRC message received from the base station. The terminal may transmit the SRS by using the SRS configuration information and additional information obtained through MAC CE signaling and/or DCI signaling. The SRS configuration information may be signaled in a UE-specific manner.

The terminal may generate the SRS based on the SRS signal information, and may transmit the SRS in the SRS resources configured by the base station. When periodic SRS or semi-persistent SRS is configured to the terminal, the terminal may transmit the SRS in a frequency domain resource configured for each SRS occasion. When aperiodic SRS is configured to the terminal and a control channel triggering SRS transmission is received from the base station, the terminal may generate the SRS based on the SRS signal information, and may transmit the SRS by using an SRS resource configured by the base station at a time point triggered by the base station or at a preconfigure time point.

When the SRS is configured in the first 2D domain, the terminal may transmit a shared channel by performing a rate matching operation on the resources allocated for the SRS transmission. When the SRS is configured in the second 2D domain, the terminal may transmit a shared channel by performing a rate matching operation or a puncturing operation on the resources allocated for the SRS transmission. When both the rate matching operation and the puncturing operation are supported, the base station may signal a processing scheme (e.g., rate matching operation or puncturing operation) to the terminal, and the terminal may transmit a shared channel according to the processing scheme indicated by the base station.

Method 3200: In Method 3000, the terminal may perform a channel measurement operation based on a signal received from the base station, and based on a result of the channel measurement operation, may generate channel state information (e.g., power-delay-Doppler profile, root mean square (RMS) delay spread (or maximum delay spread), maximum Doppler spread, or signal-to-interference-plus-noise ratio (SINR) and/or channel quality indicator (CQI) for each candidate spread resource block size). The terminal may report the channel state information to the base station, and the base station may select the spreading resource block size based on the channel state information received from the terminal.

Method 4000: In the multi-block spreading-based multi-carrier modulation operation or demodulation operation of the terminal, the terminal (e.g., a transmitting terminal and/or a receiving terminal) may select the spreading resource block size, and report information of the selected spreading resource block size (hereinafter, referred to as 'spreading resource block size information') to the base station. The terminal may select the spreading resource block size based on a channel measurement result. The terminal may perform the multi-block spreading-based multi-carrier modulation or demodulation by applying the spreading resource block size reported to the base station. When the application of the spreading resource block size is confirmed by the base station (e.g., when information to approve the application of the spreading resource block size is received from the base station), the terminal may apply the spreading resource block size reported to the base station. In the above-described confirmation procedure, the base station may approve the application of the spreading resource block size reported by the terminal. In this case, the terminal may perform the multi-block spreading-based multi-carrier modulation or demodulation by applying the spreading resource block size reported to the base station. On the other hand, in the above-described confirmation procedure, the base station may reject the application of the spreading resource block size reported by the terminal. For example, the base station may transmit information indicating rejection of the application of the spreading resource block size reported by the terminal to the terminal. Alternatively, when information for approving the application of the corresponding spreading resource block size is not received within a preset time from the time when the spreading resource block size information is reported to the base station, the terminal may determine that the base station rejects the application of the spreading resource block size. In this case, the terminal may perform the multi-block spreading-based multi-carrier modulation operation or demodulation operation by using a previously applied spreading resource block size. The previously applied spreading resource block size may be a spreading resource block size approved in the previous confirmation procedure.

When the base station rejects the application of the spreading resource block size requested from the terminal, and the spreading resource block size approved in the previous confirmation procedure does not exist, the terminal may perform the multi-block spreading-based multi-carrier modulation operation or demodulation operation by applying a predefined spreading resource block size (e.g., spreading resource block size defined as a fallback mode). The spreading resource block size candidate(s) that the terminal can report to the base station may be fixedly defined in advance. Alternatively, the base station may inform the terminal of configuration information of the spreading resource block size candidate(s) through signaling (e.g., semi-static signaling through an RRC message). The terminal may select one spreading resource block size candidate based on the channel measurement result from among the spreading resource block size candidate(s) configured by the base station, and may report the selected one spreading resource block size candidate to the base station.

In Method 3200, the terminal may measure a channel for the base station, and may generate channel state information (e.g., power-delay-Doppler profile) that is a result of the channel measurement operation. In Method 4000, the terminal may measure a channel for the base station, and may select the spreading resource block size based on the measured channel. In Methods 3000 to 4000, the base station may transmit configuration information of a channel state information-reference signal (CSI-RS) (hereinafter, 'CSI-RS configuration information') to the terminal for the channel measurement of the terminal. The terminal may receive the CSI-RS configuration information from the base station, may receive an CSI-RS from the base station based on the corresponding configuration information, and may measure a channel based on the received CSI-RS.

The CSI-RS may be transmitted in the first 2D domain (e.g., delay-Doppler domain) or the second 2D domain (e.g., frequency-time domain). "The CSI-RS is transmitted in the first 2D domain" may mean that "the CSI-RS is mapped to the first 2D domain, the CSI-RS mapped to the first 2D domain is spread in the second 2D domain, and the CSI-RS spread in the second 2D domain is transmitted". "The CSI-RS is transmitted in the second 2D domain" may mean "the CSI-RS mapped to the second 2D domain is transmitted without a processing operation related to the first 2D domain".

When the channel measurement operation based on the CSI-RS is performed in the first 2D domain, the terminal may perform an operation of generating the channel state information (e.g., Method 3200) and an operation of selecting the spreading resource block size (e.g., Method 400) by using an instantaneous channel of the first 2D domain, a power of the instantaneous channel, and/or an average power measured based on a plurality of CSI-RSs received within a channel measurement window.

When the channel measurement operation based on the CSI-RS is performed in the second 2D domain, the terminal may measure an instantaneous channel in the second 2D domain, and transform the measured instantaneous channel into a channel in the first 2D domain. The terminal may perform an operation of generating the channel state information (e.g., Method 3200) and an operation of selecting the spreading resource block size (e.g., Method 400) by using the transformed channel, a power of the transformed channel, and/or an average power measured based on a plurality of CSI-RSs received within a channel measurement window.

For the channel measurement operation, the base station may signal configuration information of a channel measurement periodicity and/or the channel measurement window to the terminal, and the terminal may perform the channel measurement operation according to the signaling. The CSI-RS for selection of the spreading resource block size may be configured. Alternatively, a CSI-RS configured for another purpose or general purpose may be used for selection of the spreading resource block size.

In Method 3200, in reporting the channel state information based on the channel measurement, the base station may signal configuration information for the channel state information reporting to the terminal, and the terminal may report the channel state information to the base station according to the signaling. The configuration information for the channel state information reporting may include information related to a transmission periodicity and/or a transmission occasion of the channel state information.

In Method 4000, the base station may signal to the terminal configuration information for reporting of information on the spreading resource block size (i.e., spreading resource block size information) selected based on the channel measurement, and the terminal may report the spreading resource block size information to the base station according to the signaling. The configuration information for the reporting of the spreading resource block size information may include information related to a transmission periodicity and/or a transmission occasion of the spreading resource block size information. Each of the channel state information and the spreading resource block size information may be transmitted on an uplink control channel and/or an uplink shared channel. For example, the channel state information and/or spreading resource block size information may be included in UCI.

The base station may configure periodic CSI-RS, aperiodic CSI-RS, and/or semi-persistent CSI-RS to the terminal for the channel measurement. Configuration information for CSI-RS reception (hereinafter referred to as 'CSI-RS configuration information') may include CSI-RS resource-related information (hereinafter, referred to as 'CSI-RS resource information'), CSI-RS signal information (e.g., sequence generation information, power boosting information, and/or waveform information), and/or information on the number of CSI-RS ports.

When CSI-RS transmission is configured in the first 2D domain, the CSI-RS resource information may include time domain resource information (e.g., offset information for an occasion, transmission periodicity information, and/or time resource length information), frequency domain resource information (e.g., CC information, BWP information, start position information of a band of the CSI-RS, and/or CSI-RS bandwidth information), and/or delay-Doppler domain resource information (e.g., start position and length information of delay resources and/or start position and length information of Doppler resources). That is, the delay-Doppler domain resource information may indicate a position of resources in the delay-Doppler domain that are spread to resources allocated for the CSI-RS in the frequency-time domain.

The CSI-RS signal transmitted in the first 2D domain may have an impulse-shaped waveform. For example, among the resources allocated for the CSI-RS in the delay-Doppler domain, only a central resource may have a non-zero power, and a power of the remaining resources excluding the central resource may be zero. Data symbols may not be allocated to the resources with zero power. The CSI-RS may have different waveforms.

The CSI-RS signals transmitted in the second 2D domain may be arranged in a scattered form. For example, the CSI-RS may be composed of signals having non-zero power at regular intervals.

The CSI-RS configuration information may be signaled from the base station to the terminal through an RRC message. The terminal may transmit the CSI-RS by using the CSI-RS configuration information and additional information acquired through MAC CE signaling and/or DCI signaling. The CSI-RS configuration information may be signaled UE-specifically.

The terminal may receive the CSI-RS in CSI-RS resources configured by the base station. When periodic CSI-RS or semi-persistent CSI-RS is configured to the terminal, the terminal may receive the CSI-RS in a frequency domain resource or a delay-Doppler domain resource configured for each CSI-RS occasion. When aperiodic CSI-RS is configured to the terminal, and a channel measurement operation using the CSI-RS or an operation of reporting channel state information based on the CSI-RS is triggered by a control channel of the base station, the terminal may receive the CSI-RS through a preconfigured resource at a preconfigured reception time and/or a reception time triggered by the base station.

When the CSI-RS is configured to the terminal in the first 2D domain, the terminal may receive a shared channel by performing a rate matching operation on the resources allocated for the CSI-RS. When the CSI-RS is configured to the terminal in the second 2D domain, the terminal may receive a shared channel by performing a rate matching operation or a puncturing operation on the resources allocated for the CSI-RS. When both the rate matching operation and the puncturing operation are supported, the base station may signal a processing scheme (e.g., rate matching operation or puncturing operation) to the terminal, and the terminal may receive the shared channel according to the signaling of the base station.

The spreading resource block size for the multi-block spreading-based multi-carrier may be specifically selected according to a link type (e.g., uplink, downlink, sidelink, etc.). Alternatively, the spreading resource block size may be equally selected irrespective of the link type. The spreading resource block size may be specifically selected according to a terminal type (e.g., terminal, terminal group, or terminal pair). Alternatively, the spreading resource block size may be equally selected irrespective of the terminal type.

[Method of Setting 2D Spreading Resource Block Size (Method 5000)]

As in Method 3000, the base station may select a spreading resource block size so that the terminal (e.g., a transmitting terminal and/or a receiving terminal) performs a modulation operation (or demodulation operation) of a multi-block spreading-based multi-carrier, and may configure the spreading resource block size to the terminal. A method of configuring the spreading resource block size may be performed as follows.

The base station may configure the 2D spreading resource block size to the terminal. In a transmission procedure, the terminal may perform spreading from the first 2D domain to the second 2D domain for each 2D spreading resource block by using the 2D spreading resource block size configured by the base station. In a reception procedure, the terminal may perform despreading from the second 2D domain to the first 2D domain by using the 2D spreading resource block size configured by the base station.

A configuration signaling message of the 2D spreading resource block size and an application method of the configuration signaling message may be as follows. The 2D spreading resource block size may be configured differently according to a link type (e.g., downlink, uplink, sidelink, etc.). Alternatively, the 2D spreading resource block size may be configured in common regardless of the link type. The 2D spreading resource block size may be configured in a UE-specific manner. Alternatively, the 2D spreading resource block size may be commonly configured for a terminal or a terminal group.

Since a size of allocated resources may vary in the transmission procedure, the 2D spreading resource block size may be configured differently according to the size of allocated resources. Alternatively, the 2D spreading resource block size may be configured regardless of the size of the allocated resources.

The resource allocation information in the second 2D domain may be included in downlink allocation information, uplink allocation information, sidelink allocation information, and/or other link allocation information. The allocated resources in the second 2D domain may be divided by the 2D spreading resource block size configured by the base station. When the allocated resources in the second 2D domain are not divided by the spreading resource block size, time and/or frequency resources having a high (or low) index may be configured as a spreading resource block having a size smaller than the configured spreading resource block size, and the remaining spreading resource blocks may be defined to have the configured spreading resource block size. The 2D spreading resource block size may be expressed as a combination of a 'Doppler-to-time spreading resource block size for spreading from the Doppler domain to the time domain' and a 'delay-to-frequency spreading resource block size for spreading from the delay domain to the frequency domain'.

The Doppler-to-time spreading resource block size may be configured for each multi-carrier symbol (or OFDM symbol) within a TTI. For example, when the number of multi-carrier symbols within the TTI is 2, 7, 14, 28, or 56, the Doppler-to-time spreading resource block size may be configured for each multi-carrier symbol. A unit of the Doppler-to-time spreading resource block size may be the number of multi-carrier symbols or OFDM symbols.

The delay-to-frequency spreading resource block size may be configured for each size of a resource block (RB), subband, or precoding resource group (PRG) within a bandwidth. For example, when the number of RBs within the bandwidth is 4, 8, 16, 32, or 64, the delay-to-frequency spreading resource block size may be configured for each number of RBs. A unit of the delay-to-frequency spreading resource block size may be the number of subcarriers, RBs, subbands, or PRGs.

The resource allocation information in the second 2D domain may be limited to indicating consecutive resources. Alternatively, the resource allocation information may be configured to indicate consecutive resources only within a spreading resource group consisting of a preset number of consecutive resources, and resources indicated by the resource allocation information between spreading resource groups are may not be consecutive. Alternatively, the continuity of the resources indicated by the resource allocation information may not be limited.

When non-consecutive resource allocation is allowed in units of a resource or a spreading resource group, logically consecutive resources may be sequentially configured after the de-mapping operation for the second 2D domain. By dividing the logically consecutive resources by the 2D spreading resource block size configured by the base station, the resources may correspond to a 2D spreading resource group (e.g., 2D spreading resource block). Alternatively, when non-consecutive resource allocation in units of a spreading resource group is allowed, the 2D spreading resource block size may be configured to be an integer multiple (e.g., 1 time, 2 times, etc.) of the size of the spreading resource group.

Restrictions on the resource allocation may be configured so that resources allocated in the second 2D domain corresponding to each 2D spread resource block have continuity regardless of the continuity of the allocated resources. Even when non-consecutive resource allocation is supported, a restriction on resource allocation in the second 2D domain may be configured such that resources are allocated in the second 2D domain consecutively at least in units of the 2D spread resource block size. The terminal may not expect resource allocation other than the above-described resource allocation (e.g., resource allocation limitation).

The base station may signal the 2D spreading resource block size to the terminal, and the terminal may configure the 2D spreading resource block size according to the signaling of the base station. The above-described signaling may have one or more features below, and may be performed according to feature(s) below.

The spreading resource block size may be configured to be UE-specific or UE group-specific. Alternatively, the spreading resource block size may be set in common for all terminals.

The spreading resource block size may be configured for each link type (e.g., uplink, downlink, sidelink, etc.). Alternatively, the spreading resource block size may be set in common regardless of the link type.

In the downlink transmission procedure, the base station may perform a multi-carrier modulation operation based on the signaled 2D spreading resource block size.

In the downlink reception procedure, the terminal may perform a multi-carrier demodulation operation based on the 2D spreading resource block size set by the signaling of the base station.

In the uplink transmission procedure, the terminal may perform a multi-carrier modulation operation based on the 2D spreading resource block size set by the signaling of the base station.

In the uplink reception procedure, the base station may perform a multi-carrier demodulation operation based on the signaled 2D spreading resource block size.

The signaling may be signaling of an RRC message or signaling of a MAC CE. The terminal may apply the currently signaled setting and may maintain the corresponding setting until reception of the next signaling.

The signaling may be a combination of signaling of an RRC message and signaling of a MAC CE. The base station may configure spreading resource block size candidate(s) to the terminal by signaling an RRC message. The terminal may apply the currently signaled setting and may maintain the corresponding setting until reception of the next signaling. The base station may configure one of the spreading resource block size candidate(s) configured by the RRC message to the terminal by signaling a MAC CE. The terminal may apply the currently signaled setting and may maintain the corresponding setting until reception of the next signaling.

The signaling may be a combination of signaling of an RRC message and signaling of DCI. The base station may configure spreading resource block size candidate(s) to the terminal by signaling an RRC message. The base station may configure one of the spreading resource block size candidate(s) configured by the RRC message to the terminal by signaling DCI. The terminal may apply the currently signaled setting and may maintain the corresponding setting until reception of the next signaling. The terminal may apply the spreading resource block size indicated by the DCI in a reception operation or a transmission operation of a transport block scheduled by the DCI.

According to a fallback mode, a spreading operation of all resources or a specific resource block size for one spreading resource block may be defined in advance.

A signaling method of whether 2D spreading is applied may be as follows. The base station may signal information indicating whether to apply the 2D spreading to the terminal, and the terminal may or may not apply the 2D spreading according to the signaling of the base station. The signaling for the above-described operation may include one or more features below, and may be performed based on the feature(s) below.

The base station may signal information indicating whether to apply the 2D spreading (hereinafter referred to as '2D spreading application indicator') to the terminal. The 2D spreading application indicator may be configured to be UE-specific or UE group-specific. Alternatively, the 2D spreading application indicator may be configured in common for all terminals. The 2D spreading application indicator may be configured for each link type (e.g., uplink, downlink, sidelink, etc.). Alternatively, the 2D spreading application indicator may be set in common regardless of the link type. One dimension may correspond to the frequency domain and the other dimension may correspond to the time domain. The 2D spread application indicator for each dimension may be configured. The 2D spreading application indicator for each dimension may be signaled. A mode in which 2D spreading is not applied in both dimensions may be OFDM or OFDMA. A mode in which spreading is applied in the frequency domain may be SC-FDM or SC-FDMA.

The 2D spreading application indicator may be signaled through an RRC message, MAC CE, or DCI. When the 2D spreading application indicator is signaled by an RRC message or MAC CE, the terminal may apply the currently signaled configuration and maintain the current configuration until reception of the next signaling. When the 2D spreading application indicator is signaled by DCI, the terminal may apply the 2D spreading application indicator included in the DCI in a reception operation or a transmission operation of a transport block scheduled by the DCI.

According to a fallback mode, activation or deactivation of 2D spreading application may be predefined.

[Link Allocation Method]

For the multi-block spreading-based multi-carrier modulation operation or demodulation operation of the terminal, the base station may select a subcarrier spacing (SCS) and/or a spreading resource block size, and may signal information of the SCS and/or spreading resource block size to the terminal. The terminal may perform the multi-block spreading-based multi-carrier modulation operation or demodulation operation based on the SCS and/or spreading resource block size signaled from the base station. An SCS and/or spreading resource block size for each of a physical broadcast channel and a physical control channel may be implicitly obtained through blind estimation. Alternatively, the SCS and/or spreading resource block size for may be predefined to use fixed values.

In the transmission/reception operation using the multi-block spreading-based multi-carrier, a multiplexing operation of different physical channels and/or a multiple access operation of different terminals in the first 2D domain resources and/or the second 2D domain resources may be performed. For the multiplexing and/or multiple access, resource allocation information for transmission or reception of different physical channels (e.g., broadcast channel, control channel, data, shared channel, etc.) may be signaled from the base station to a transmitting terminal or a receiving terminal. The terminal may perform a transmission operation or a reception operation of physical channel(s) based on the resource allocation information signaled by the base station. The resource allocation information may indicate exactly one resource region. This may be Method 100. Alternatively, the resource allocation information may indicate a resource set including a plurality of candidate resource regions. This may be Method 200. When Method 200 is performed, the receiving terminal may attempt demodulation and decoding for each preconfigured candidate resource region in the resource set. When Method 200 is performed, the transmitting terminal may select one candidate resource region arbitrarily or based on a predefined rule from among the preconfigured candidate resource region(s) in the resource set, and may perform the transmission operation in the selected candidate resource region.

[Downlink Allocation Method]

In a transmission procedure of a downlink data channel, the base station may transmit downlink allocation information on a control channel for reception of the terminal. The terminal may receive the control channel (e.g., DCI), obtain the downlink allocation information from the control channel, and receive the data channel (e.g., shared channel) based on the downlink allocation information.

Method 6000: Downlink allocation method in case of multiple access only in the second 2D domain A downlink allocation method in the case of multiple access only in the second 2D domain will be described. For the multiple access in the second 2D domain, second 2D domain resources may be orthogonally allocated to different terminals (or different terminal groups). The following exemplary embodiment will be described focusing on the terminal operation, and the terminal group operation may be performed the same or similar to the terminal operation described later. In the downlink transmission procedure for each terminal, the base station may perform a multi-carrier modulation operation by spreading data symbols and a reference signal mapped to first 2D domain resources to second 2D domain resources allocated UE-specifically.

The downlink allocation information may include a carrier indicator, a BWP indicator, resource allocation information in the second 2D domain (e.g., time domain resource allocation information, frequency domain resource allocation information, MCS, new data indicator (NDI), redundancy version (RV), and/or HARQ process number. The downlink allocation information may further include other information element(s) in addition to the above-described information elements.

The frequency domain resource allocation information may indicate frequency domain resources in units of RBs. The RB may include n subcarriers. n may be a natural number. For example, n may be 12. The frequency domain resource allocation information may be composed of a bitmap indicating whether RBs are allocated and/or an index indicating a start RB and the number of allocated RBs. The frequency domain resource allocation information may indicate RB(s) belonging to a BWP.

The time domain resource allocation information may be composed of an index indicating a start MC symbol (or OFDM symbol) and a length of an MC symbol. The time domain resource allocation information may support allocation of consecutive MC symbols or non-consecutive MC symbols. Here, the MC symbol-related operation may be equally or similarly applied to the OFDM symbol-related operation.

The terminal may perform a multi-carrier demodulation operation on MC symbols indicated by the time domain resource allocation information. After performing the multi-carrier demodulation operation, the terminal may de-map data symbols (e.g., spread data symbols) from subcarrier resources indicated by the frequency domain resource allocation information in each MC symbol in the frequency-time domain resources. If necessary, the terminal may perform a channel estimation operation and/or a channel equalization operation in the second 2D domain on the data symbols de-mapped in the second 2D domain. As described above, the de-mapped data symbols may correspond to each 2D spreading resource group according to a predefined rule. The above-described post-processing operation may be performed for each spreading resource group, and the de-mapping operation may be performed in the first 2D domain. The channel estimation operation and/or the channel equalization operation in the first 2D domain may be performed for each spreading resource group for the data symbols de-mapped in the first 2D domain. When the demodulation operation and the channel equalization operation are completed, the terminal may obtain LLRs for coded bits by performing a de-mapping operation according to the MCS included in the downlink allocation information for each of the data symbols, and then, may obtain information or message bits by performing a channel decoding operation.

Method 7000: Downlink allocation method in case of multiple access in the second 2D domain and the first 2D domain A downlink allocation method in case of multiple access in the second 2D domain and the first 2D domain will be described. A case of multiple access only in the first 2D domain not in the second 2D domain may also be regarded as the case of multiple access in the second 2D domain and in first 2D domain. For the multiple access in the second 2D domain, second 2D domain resources may be orthogonally allocated to different terminals (or terminal groups). The different terminals may perform a multiple access operation using the orthogonal second 2D domain resources. The orthogonal second 2D domain resources may be indicated by an explicit method and/or an implicit method. Alternatively, orthogonal first 2D domain resources may be predefined. For the multiple access in the first 2D domain, first 2D domain resources may be orthogonally allocated to different terminals (or terminal groups). The different terminals may perform a multiple access operation using the orthogonal first 2D domain resources. The following exemplary embodiments will be described with a focus on a terminal operation, and the terminal operation may be applied identically or similarly to a terminal group operation.

When the terminal(s) performing multiple access in the second 2D domain, multiple access in the first 2D domain may not be required for the corresponding terminal(s). Terminals allocated to the same resources in the second 2D domain may have multiple access in the first 2D domain. In the downlink transmission procedure, the base station may map data symbols and a reference signal to UE-specifically allocated resources in the first 2D domain, may perform a spreading operation for the UE-specifically allocated resources in the second 2D domain, and may perform a multi-carrier demodulation operation after completion of the spreading operation. In general, since data symbols mapped to different first 2D domain resources in the same spreading resource group experience the same channel, it may be preferable to allocate consecutive resources in the first 2D domain to each terminal. The base station may transmit UE-specific reference signal(s) and/or UE-common reference signal(s) in the first 2D domain. When the number of spreading resource groups is plural, it may be limited to allocating the same resources in the first 2D domain to each spreading resource group, and the allocated resources in the first 2D domain may be applied to the spreading resource group differently according to a resource hopping rule. If both of the above-described methods are supported (or all of a plurality of methods are supported), the base station may configure in advance which rule (e.g., which method) is to be applied to the terminal.

The downlink allocation information may include a carrier indicator, a BWP indicator, resource allocation information in the first 2D domain (e.g., Doppler domain resource allocation information and/or delay domain resource allocation information), MCS, NDI, RV, and/or HARQ process number. The downlink allocation information may further include other information element(s) in addition to the above-described information elements. Allocated resources in the second 2D domain may be predefined. Alternatively, the allocated resources in the second 2D domain may be defined so as to be implicitly indicated from other allocation information. For example, the allocated resources in the second 2D domain may be predefined as resources within a BWP indicated by the BWP indicator. The second 2D domain resource allocation information may include time domain resource allocation information and/or Doppler domain resource allocation information. The second 2D domain resource allocation information may be included in the downlink allocation information (e.g., DCI). Alternatively, the second 2D domain resource allocation information may be signaled through an RRC message and/or MAC CE. The time domain resource allocation information in the second 2D domain resource allocation information may be signaled through the downlink allocation information (e.g., DCI), an RRC message, and/or MAC CE, and the frequency domain resource allocation information in the second 2D domain resource allocation information may be predefined. The frequency domain resource allocation information in the second 2D domain resource allocation information may be signaled through downlink allocation information (e.g., DCI), an RRC message, and/or a MAC CE, and the time domain resource allocation information of the second 2D domain resource allocation information may be predefined. In the signaling procedure of time domain resources through the downlink allocation information, the method described above in Method 5000 may be applied identically or similarly. In the signaling procedure of frequency domain resources through the downlink allocation information, the method described above in Method 5000 may be applied identically or similarly.

The terminal may perform a multi-carrier demodulation operation for MC symbols (or preconfigured MC symbols) indicated by the time domain resource allocation information (e.g., DCI, RRC message, and/or MAC CE). After performing the multi-carrier demodulation operation, the terminal may de-map data symbols (e.g., spread data symbols) from subcarrier resources (or preconfigured subcarrier resources) indicated by the frequency domain resource allocation information (e.g., DCI, RRC message, and/or MAC CE) in each MC symbol in the frequency-time domain resources. If necessary, the terminal may perform a second 2D domain channel estimation operation and/or channel equalization operation on the de-mapped data symbols in the second 2D domain. As described above, the de-mapped data symbols may correspond to each spreading resource group according to a predefined rule. The above-described post-processing operation may be performed for each 2D spreading resource group, and the terminal may perform a de-mapping operation from resources (e.g., UE-specific resources) indicated by the resource allocation information in the first 2D domain for each spreading resource group. The terminal may perform a first 2D channel estimation operation and/or channel equalization operation on the de-mapped data symbols in the first 2D domain. If necessary, in order to mitigate, suppress, and/or eliminate interference caused by multiple access in the first 2D domain within the same spreading resource group, terminals performing multiple access in the first 2D domain within the same spreading resource group may jointly perform the channel estimation operation and/or channel equalization operation. When the demodulation operation and the channel equalization operation are completed, the terminal may acquire LLRs for coded bits by performing a de-mapping operation for each of the data symbols, and may obtain information and/or message bits by performing a channel decoding operation. In order to limit the influence of interference between terminals performing multi-access in the first 2D domain within the same spreading resource group, a guard resource may be inserted between the resources allocated to different terminals.

[Uplink Allocation Method]

In the uplink allocation procedure, the above-described downlink allocation method (e.g., Method 6000 and/or Method 7000) may be applied identically or similarly. However, the terminal may perform a transmission operation instead of a reception operation according to uplink allocation of the base station, and the base station may perform a reception operation instead of a transmission operation according to the uplink allocation. Information element(s) included in uplink allocation information may be different from the information element(s) included in the downlink allocation information. The uplink allocation information may include information element(s) included in the downlink allocation information defined in the above-described downlink allocation method.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a communication system, the operation method comprising:
    performing an operation for channel measurement between the base station and a terminal;
    determining a size of multiple spreading resource blocks configured in a second two-dimensional (2D) domain based on a result of the channel measurement;
    transmitting information indicating the size of the multiple spreading resource blocks to the terminal; and
    performing a communication procedure with the terminal based on the multiple spreading resource blocks having the size,
    wherein when the communication procedure is a transmission procedure, data symbols in a first 2D domain are spread to the multiple spreading resource blocks configured in the second 2D domain, and when the communication procedure is a reception procedure, the multiple spreading resource blocks configured in the second 2D domain are despread to data symbols in the first 2D domain,
    a reference signal for the channel measurement is configured to be transmitted or received in the first 2D domain or the second 2D domain.

2. The operation method according to claim 1, wherein the performing of the operation for the channel measurement comprises:
    transmitting sounding reference signal (SRS) configuration information to the terminal;
    receiving an SRS from the terminal based on the SRS configuration information; and
    performing the channel measurement based on the SRS.

3. The operation method according to claim 2, wherein when the SRS is transmitted in the first 2D domain, the SRS configuration information includes first 2D domain resource allocation information indicating first 2D domain resources to which the SRS is mapped and second 2D domain resource allocation information indicating second 2D domain resources to which the SRS mapped to the first 2D domain resources is spread.

4. The operation method according to claim 1, wherein the performing of the operation for the channel measurement comprises:
transmitting channel state information-reference signal (CSI-RS) configuration information to the terminal;
transmitting a CSI-RS to the terminal based on the CSI-RS configuration information; and
receiving, from the terminal, channel measurement information generated based on the CSI-RS.

5. The operation method according to claim 1, wherein the information indicating the size of the multiple spreading resource blocks is transmitted through a radio resource control (RRC) message.

6. The operation method according to claim 1, wherein the transmitting of the information indicating the size of the multiple spreading resource blocks comprises:
transmitting an RRC message including information indicating candidate sizes of the multiple spreading resource blocks to the terminal; and
transmitting a medium access control (MAC) control element (CE) or downlink control information (DCI) indicating one candidate size among the candidate sizes to the terminal.

7. The operation method according to claim 1, wherein the first 2D domain is a delay-Doppler domain, and the second 2D domain is a frequency-time domain.

8. An operation method of a terminal in a communication system, the operation method comprising:
performing an operation for channel measurement between the terminal and a base station;
receiving, from the base station, information indicating a size of multiple spreading resource blocks determined based on a result of the channel measurement; and
performing a communication procedure based on the multiple spreading resource blocks having the size,
wherein when the communication procedure is a transmission procedure, data symbols in a first 2D domain are spread to the multiple spreading resource blocks configured in a second 2D domain, and when the communication procedure is a reception procedure, the multiple spreading resource blocks configured in the second 2D domain are despread to data symbols in the first 2D domain,
a reference signal for the channel measurement is configured to be transmitted or received in the first 2D domain or the second 2D domain.

9. The operation method according to claim 8, wherein the performing of the operation for the channel measurement comprises:
receiving sounding reference signal (SRS) configuration information from the base station; and
transmitting an SRS to the base station based on the SRS configuration information,
wherein the result of the channel measurement is a result of measuring the SRS.

10. The operation method according to claim 9, wherein when the SRS is configured in the first 2D domain, a rate matching operation is performed on resources allocated for the SRS, and when the SRS is configured in the second 2D domain, a rate matching operation or a puncturing operation is performed on resources allocated for the SRS.

11. The operation method according to claim 8, wherein the performing of the operation for the channel measurement comprises:
receiving channel state information-reference signal (CSI-RS) configuration information from the base station;
performing channel measurement on a CSI-RS received from the base station based on the CSI-RS configuration information; and
transmitting a result of the channel measurement to the base station.

12. The operation method according to claim 11, wherein when the CSI-RS is configured in the first 2D domain, a rate matching operation is performed on resources allocated for the SRS, and when the CSI-RS is configured in the second 2D domain, a rate matching operation or a puncturing operation is performed on resources allocated for the CSI-RS.

13. The operation method according to claim 11, wherein when the CSI-RS is transmitted in the first 2D domain, the CSI-RS configuration information includes first 2D domain resource allocation information indicating first 2D domain resources to which the CSI-RS is mapped and second 2D domain resource allocation information indicating second 2D domain resources to which the CSI-RS mapped to the first 2D domain resources is spread.

14. The operation method according to claim 8, wherein the information indicating the size of the multiple spreading resource blocks is received through a radio resource control (RRC) message.

15. The operation method according to claim 8, wherein the receiving of the information indicating the size of the multiple spreading resource blocks comprises:
receiving an RRC message including information indicating candidate sizes of the multiple spreading resource blocks from the base station; and
receiving a medium access control (MAC) control element (CE) or downlink control information (DCI) indicating one candidate size among the candidate sizes from the base station.

16. An operation method of a terminal in a communication system, the operation method comprising:
performing an operation for channel measurement between the terminal and a base station;
determining a first size of multiple spreading resource blocks configured in a second two-dimensional (2D) domain based on a result of the channel measurement;
reporting information indicating the first size of the multiple spreading resource blocks to the base station; and
performing a communication procedure based on the multiple spreading resource blocks,
wherein when the communication procedure is a transmission procedure, data symbols in a first 2D domain are spread to the multiple spreading resource blocks configured in the second 2D domain, and when the communication procedure is a reception procedure, the multiple spreading resource blocks configured in the second 2D domain are despread to data symbols in the first 2D domain,
a reference signal for the channel measurement is configured to be transmitted or received in the first 2D domain or the second 2D domain.

17. The operation method according to claim 16, further comprising receiving, from the base station, an indicator approving application of the first size of the multiple spreading resource blocks reported to the base station, wherein when the indicator is received, the communication procedure is performed based on the multiple spreading resource blocks having the first size.

18. The operation method according to claim 16, further comprising receiving, from the base station, an indicator rejecting application of the first size of the multiple spreading resource blocks reported to the base station, wherein when the indicator is received, the communication procedure is performed based on the multiple spreading resource blocks having a second size, and the second size is a size of multiple spreading resource blocks used in another communication procedure performed before the communication procedure.

19. The operation method according to claim 16, further comprising receiving, from the base station, information of candidate sizes of the multiple spreading resource blocks, wherein the first size is selected from among the candidate sizes.

20. The operation method according to claim 16, further comprising receiving, from the base station, configuration information for reporting the information indicating the first size of the multiple spreading resource blocks, wherein the configuration information includes at least one of transmission periodicity information and transmission occasion information, and the information indicating the first size of the multiple spreading resource blocks is transmitted using resources indicated by the configuration information.

* * * * *